US007580184B2

(12) United States Patent
Shu et al.

(10) Patent No.: US 7,580,184 B2
(45) Date of Patent: Aug. 25, 2009

(54) GIRES-TOURNOIS ETALONS AND DISPERSION COMPENSATORS

(75) Inventors: Xuewen Shu, Birmingham (GB); Catherine Anne Sugden, Birmingham (GB); Ian Bennion, Ravensthorpe (GB)

(73) Assignee: Aston University, Birmingham, West Midlands (GB)

( * ) Notice: Subject to any disclaimer, the term of this patent is extended or adjusted under 35 U.S.C. 154(b) by 122 days.

(21) Appl. No.: 11/813,424

(22) PCT Filed: Dec. 15, 2005

(86) PCT No.: PCT/GB2005/004838

§ 371 (c)(1),
(2), (4) Date: Jul. 5, 2007

(87) PCT Pub. No.: WO2006/072759

PCT Pub. Date: Jul. 13, 2006

(65) Prior Publication Data

US 2008/0204859 A1 Aug. 28, 2008

(30) Foreign Application Priority Data

Jan. 5, 2005 (GB) ................................. 0500137.5

(51) Int. Cl.
*H04B 10/17* (2006.01)
*G02F 1/295* (2006.01)
*G02B 6/34* (2006.01)
(52) U.S. Cl. .......................... 359/337.5; 385/7; 385/10; 385/37
(58) Field of Classification Search ............... 359/337.5; 385/7, 10, 37
See application file for complete search history.

(56) References Cited

U.S. PATENT DOCUMENTS 6,181,840 B1    1/2001    Huang et al.

(Continued)

FOREIGN PATENT DOCUMENTS

EP    0924546    6/1999

(Continued)

OTHER PUBLICATIONS

Shu et al., "Tunable dispersion compensator based on novel distributed Gires-Tournois etalons", Optical Fiber Communications Conference, vol. 2, pp. 513-514, Mar. 23-28, 2003.*

(Continued)

*Primary Examiner*—Eric Bolda
(74) *Attorney, Agent, or Firm*—Darby & Darby P.C.; Patrick R. Turner

(57) ABSTRACT

A Gires-Tournois etalon (GTE) (10) comprising an optical fiber (12) in which a primary chirped fiber Bragg grating (FBG) (16) is provided, an RF signal generator (20), a piezo-electric transducer (22), and a glass horn (24), for coupling an acoustic wave (26) into the fiber (12). The acoustic wave (26) causes a periodic compression within the fiber (12), which induces a low frequency periodic refractive index modulation within the grating section (14) of the fiber (12). This causes two side frequency components to be generated for each high-frequency component of the FBG (16). Two secondary grating are thus excited, having the same spectral bandwidth as the FBG (16), but a lower reflectivity and different central wavelengths. The free spectral range of the GTE (10) can be adjusted by varying the frequency of the acoustic wave (26). The reflectivity of the excited secondary gratings can be adjusted by adjusting the amplitude of the acoustic wave (26).

30 Claims, 13 Drawing Sheets

U.S. PATENT DOCUMENTS

| | | | |
|---|---|---|---|
| 6,317,539 B1* | 11/2001 | Loh et al. | 385/37 |
| 6,381,069 B1* | 4/2002 | Riant et al. | 359/569 |
| 6,510,256 B1 | 1/2003 | Asseh et al. | |
| 6,822,747 B1* | 11/2004 | Li et al. | 356/519 |
| 2001/0021294 A1* | 9/2001 | Cai et al. | 385/37 |
| 2002/0094165 A1* | 7/2002 | Rothenberg | 385/37 |
| 2002/0176659 A1* | 11/2002 | Lei et al. | 385/24 |
| 2002/0191879 A1 | 12/2002 | Liu et al. | |
| 2003/0021526 A1* | 1/2003 | Bouevitch | 385/24 |
| 2003/0210864 A1* | 11/2003 | Sugden et al. | 385/37 |
| 2004/0037505 A1* | 2/2004 | Morin | 385/37 |
| 2004/0101239 A1* | 5/2004 | Parker | 385/37 |
| 2006/0182392 A1* | 8/2006 | Larochelle et al. | 385/37 |

FOREIGN PATENT DOCUMENTS

| | | |
|---|---|---|
| WO | WO-00/50944 | 8/2000 |
| WO | WO-03/058312 | 7/2003 |

OTHER PUBLICATIONS

Chen et al., "Analysis of the Chirped Super Moire Gratings Based on Acousto-optical Superlattices," International Journal of Infrared and Millimeter Waves, Springer, Dordrecht, NL, 21(6):939-944, Jun. 2000.

Chen et al., "Superchirped Moire Grating Based on an Acousto-optic Superlattice with a Chirped Fiber Gragg Grating," Optical Letters, Optical Society of America, 24(22):1558-1560, Nov. 15, 1999.

Huang et al., "Reflectivity-Tunable Fiber Bragg Grating Reflectors," IEEE Photonics Technology Letters, IEEE Service Center, Piscataway, NJ, USA, 12(2):176-178, Feb. 2000.

Lai et al., "Optically Tunable Fiber Grating Transmission Filters," Optics Letters, Optical Society of America, 28(24):2446-2448, Dec. 15, 2003.

Liu et al., "Acoustic-induced Switching of the Reflection Wavelength in a Fiber Bragg Grating," Optics Letters, Optical Society of America, 25(18):1319-1321, Sep. 15, 2000.

Liu et al., "Acousto-optic Superlattice Modulator Using a Fiber Gragg Grating," Optics Letters, Optical Society of America, 22(19):1515-1517, Oct. 1, 1997.

Liu et al., "Improved Efficiency Narrow-Band Acoustooptic Tunable Reflector Using Fibre Bragg Grating," Bragg Gratings, Photosensitivity, and Poling in Lass Fibers and Waveguides: Applications and Fundamentals, Techinical Digest, pp. 338-341, 1997.

Liu et al., "Switchable Narrow Bandwidth Comb Filter Based on an Acoustooptic Superlattice Modulator in Sinc-sampled Fiber Gratings," Technical Digests of the Converence on Laser and Electrooptics 1999, Baltimore, MD, USA, pp. 77-78, May 23, 1999.

Liu et al., "100% Efficient Narrow-Band Acoustooptic Tunable Reflector Using Fiber Bragg Grating," Journal of Lightwave Technlogy, IEEE Service Center, New York, NY, USA, 16(11):2006-2009, Nov. 1998.

Shu et al., "Design and Realization of Dispersion Slope Compensators Using Distributed Gires-Tournois Etalons," IEEE Photonics Tech Lett., 16(4):1092-1094, Apr. 2004.

Shu et al., "Tailored Gires—Tournois Etalons as Tunable Dispersion Slope Compensators," Optics Letters, Optical Society of America, 29(9):1013-1015, May 1, 2004.

International Search Report for PCT Application No. PCT/GB2005/004838 filed Dec. 15, 2005.

United Kingdom Search Report for United Kingdom Application Serial No. GB0500137.5 filed Jan. 15, 2005.

* cited by examiner

GIRES-TOURNOIS ETALONS AND DISPERSION COMPENSATORS

CROSS-REFERENCE TO RELATED APPLICATIONS

This application is a U.S. National Phase application of International Patent Application No. PCT/GB2005/004838, filed Dec. 15, 2005, which claims priority to United Kingdom Patent Application No. 0500137.5, filed Jan. 5, 2005, the contents of which are hereby incorporated by reference.

The invention relates to Gires-Tournois etalons and to dispersion compensators.

Dispersion is a major problem for optical transmission systems. As pulses of light travel down an optical fibre transmission line they broaden due to chromatic dispersion. In addition, due to dispersion slope, the dispersion experienced by each wavelength component of an optical pulse can be different. The dispersion acquired by an optical pulse limits the length of transmission line across which a data signal (made up of a series of optical pulses) can be transmitted and successfully decoded at the receiver. Tuneable dispersion compensators are becoming key devices in high speed optical transmission systems due to dispersion tolerances rapidly being reduced with increasing bit rate, especially when the bit rate reaches 40 Gbit/s or beyond. Dynamic control of dispersion is also demanded during reconfiguration of transmission networks to compensate for effects such as the change of the link lengths or introduction of wavelength dependent routing.

A number of solutions have been proposed to address the problem of dispersion. The majority of these perform dispersion compensation on the pulses. This involves reforming the optical pulses to their original shape so that the data signal can then either be decoded or retransmitted across another transmission line.

One known dispersion compensation method utilises dispersion compensation fibre (DCF) to reverse the effects of dispersion in normal transmission fibre. Although this works well as a bulk dispersion compensator (all channels), the amount of compensation applied cannot be adjusted and it does not compensate for higher-order dispersion terms (e.g. dispersion slope). Another solution uses chirped fibre Bragg gratings (CFBG), the different wavelengths of light being reflected from different positions along the grating, thereby applying a negative dispersion to the pulse. However, CFBG based devices are long (of the order of 10 cm), making them difficult and expensive to fabricate and package, and they can suffer from high delay ripple effects (10-20 ps). A third approach is based on complex fibre Bragg gratings having a grating structure which includes multiple phase shifts and complex amplitude functions. However, these devices are primarily used only for dispersion slope compensation, and due to their fabrication complexity they suffer from low yields.

Various dispersion tuneable devices using tuneable chirped fibre Bragg gratings, virtually imaged phased arrays, and integrated optical filters have been demonstrated. Although chirped fibre Bragg grating based devices are low loss and fully compatibility with optical fibre, they can generally only be used to provide compensation on a single optical channel.

An alternative arrangement to optical fibre based dispersion compensation devices is based on thin-film Gires-Tournois etalons (GTE). These bulk optic devices rely on reflections from a thin film etalon cavity to induce a negative dispersion effect on an optical pulse. However, these devices have proved to be difficult and costly to manufacture due to the manufacturing tolerances that are required. Also, because light pulses travelling in an optical fibre have to come out of the fibre into the etalon device and then back into the fibre, these devices decrease the signal power and have long-term alignment stability and reliability problems.

The applicant has previously developed an all-fibre GTE fabricated from two fibre Bragg gratings, as described in PCT/GB03/02046. However, the reflectivity of the weakly reflective grating in the all-fibre GTE cannot be altered following fabrication, and it is difficult to fabricate a weak grating having the correct reflectivity, since post-fabrication decay in the strength of the grating and any annealing process undergone by the grating can change the final reflectivity. In addition, the fabrication process of the all fibre GTE requires very careful optical alignment in order to fabricate the fibre Bragg gratings in the correct locations to achieve the desired etalon cavity length.

According to a first aspect of the present invention there is provided a Gires-Tournois etalon comprising:
 an optical waveguide including a grating section in which a primary chirped Bragg grating, of a first reflectivity, a first central wavelength, and a first spectral bandwidth, is provided; and
 apparatus for inducing a low frequency periodic refractive index modulation within the grating section,
 wherein the addition of the low frequency periodic refractive index modulation to the primary chirped Bragg grating causes a secondary chirped Bragg grating, of a second reflectivity, a second central wavelength, and a second spectral bandwidth, to be excited,
 the first and second spectral bandwidths being substantially the same,
 the second reflectivity being lower that the first reflectivity, and being determined by the amplitude of the low frequency periodic refractive index modulation, and
 the second central wavelength being shifted from the first central wavelength by an amount determined by the frequency of the low frequency periodic refractive index modulation.

The first chirped Bragg grating is preferably a strong chirped Bragg grating, preferably having a first reflectivity of eighty percent or higher, and most preferably higher than ninety percent.

The apparatus for inducing a low frequency periodic refractive index modulation may be operable to simultaneously induce a plurality of low frequency periodic refractive index modulations of different frequency within the grating section, to thereby cause a plurality of secondary chirped Bragg gratings, each of a different central wavelength, to be excited.

The or each excited chirped Bragg grating is preferably a weak chirped Bragg grating, preferably having a reflectivity of fifty percent or lower. The or each excited chirped Bragg grating may have a reflectivity of less than one percent.

The apparatus for inducing a low frequency periodic refractive index modulation is preferably operable to vary the frequency of the or each low frequency periodic refractive index modulation, to thereby enable the wavelength shift between the primary chirped Bragg grating and the or each excited chirped Bragg grating to be changed.

The apparatus for inducing a low frequency periodic refractive index modulation may alternatively or additionally be operable to vary the amplitude of the or each low frequency periodic refractive index modulation, to thereby enable the reflectivity of the or each excited chirped Bragg grating to be changed.

The apparatus for inducing a low frequency periodic refractive index modulation preferably comprises an acoustic wave source and coupling means for coupling an acoustic wave into the optical waveguide. The acoustic wave source is preferably operable to generate one or more acoustic waves having a frequency within the radio frequency signal frequency range. The or each acoustic wave preferably has a frequency of between 1 kHz and 100 MHz.

The acoustic wave source preferably comprises a signal generator operable to generate a radio frequency electrical output signal, a signal transducer for receiving the electrical output signal and converting it into an acoustic wave, and an acoustic horn coupled to the signal transducer.

The apparatus for inducing a low frequency periodic refractive index modulation may alternatively comprise mechanical apparatus operable to induce microbends within the grating section of the waveguide.

The optical waveguide is preferably an optical fibre, and is most preferably single mode optical fibre. The optical waveguide may alternatively comprise a planar optical waveguide. The optical waveguide preferably has a high photosensitivity, in order to permit the fabrication of a strong chirped Bragg grating within the grating section. The thickness of the grating section of the optical waveguide may be reduced by etching the waveguide.

According to a second aspect of the invention there is provided a dispersion compensator comprising:
  a plurality of Gires-Tournois etalons according to the first aspect of the invention,
  the output of a first Gires-Tournois etalon being optically coupled to the input of a subsequent Gires-Tournois etalon,
  wherein an optical pulse propagating through the dispersion compensator interacts with each Gires-Tournois etalon in series,
  the distance each wavelength component of the pulse travels before exiting each Gires-Tournois etalon varying with wavelength,
  such that a wavelength dependent delay is applied to each wavelength component, thereby applying dispersion to the pulse.

The output of a first Gires-Tournois etalon may be optically coupled to the input of a subsequent Gires-Tournois etalon by means of an optical circulator or an optical coupler.

The frequency of the low frequency refractive index modulation of each Gires-Tournois etalon may be the same, thereby enabling compensation of first order dispersion to be performed.

The frequency of the low frequency refractive index modulation of each Gires-Tournois etalon may alternatively be different, giving each Gires-Tournois etalon a different free spectral range, thereby enabling compensation of second order dispersion to be performed.

The free spectral range of each Gires-Tournois etalon may be larger than the free spectral range of the subsequent Gires-Tournois etalon, the dispersion slope compensator thereby having a negative dispersion slope. Alternatively, the free spectral range of each Gires-Tournois etalon may be smaller than the free spectral range of the subsequent Gires-Tournois etalon, the dispersion slope compensator thereby having a positive dispersion slope.

Alternatively, the grating section of the waveguide of one or more Gires-Tournois etalons may taper in thickness along its length, giving the or each Gires-Tournois etalon a group delay profile having an amplitude which varies with wavelength, thereby enabling compensation of second order dispersion to be performed.

According to a third aspect of the invention there is provided a tuneable dispersion compensator comprising:

an optical waveguide having a first grating section in which a first optical waveguide grating is provided and a second grating section in which a second optical waveguide grating is provided,
  the first and second optical waveguide gratings together forming the main etalon cavity of a coupled cavity etalon, at least part of the spectral profile of each grating including the same wavelength range;
  an optical reflector, the second optical waveguide grating and the optical reflector together forming the auxiliary etalon cavity of the coupled cavity etalon; and
  optically tuneable phase-shifting means provided within one of the main etalon cavity and the auxiliary etalon cavity, and being operable to introduce a phase-shift into the cavity,
  such that the slope of the linearized group delay of the coupled cavity etalon may be changed by adjusting the relative phases of the coupled cavities.

The first and second optical waveguide gratings are preferably Bragg gratings, and are most preferably chirped Bragg gratings. The first optical waveguide grating preferably forms the input to the coupled cavity etalon and has a reflectivity of fifteen percent or less, and most preferably has a reflectivity of between six percent and seven percent.

The second optical waveguide grating preferably has a higher reflectivity that the first grating. The second optical waveguide grating preferably has a reflectivity of between fifty percent and eighty-five percent, and most preferably has a reflectivity of between sixty-five percent and seventy percent. The first and second optical waveguide gratings preferably have substantially the same central wavelength and spectral bandwidth.

The optical reflector may comprise a cleaved end of the optical waveguide, or may alternatively comprise a third optical waveguide grating, at least part of the spectral profile of the third grating including the same wavelength range as the first and second gratings. The third optical waveguide grating preferably has substantially the same central wavelength and spectral bandwidth as the first and second optical waveguide gratings.

Preferably, the main etalon cavity has a first cavity length and the auxiliary etalon cavity has a second cavity length which is generally double the first cavity length.

The optically tuneable phase-shifting means preferably comprises an optical medium having a refractive index that can be modified by optically pumping and an optical pump signal source optically coupled to the optical medium. The optical medium preferably comprises a section of a doped optical waveguide, and most preferably comprises a section of a rare-earth element doped optical waveguide, such as an Erbium doped optical waveguide or an Erbium-Ytterbium co-doped optical waveguide. The doped optical waveguide may be a doped optical fibre. The optical pump signal source preferably comprises a laser. The optical pump signal source is preferably operable to vary the optical power of the optical pump signal, thereby enabling the magnitude of the phase-shift introduced into the cavity to be altered.

The optical waveguide is preferably an optical fibre.

Embodiments of the invention will now be described in detail, by way of example only, with reference to the accompanying drawings, in which.

Figure 7:
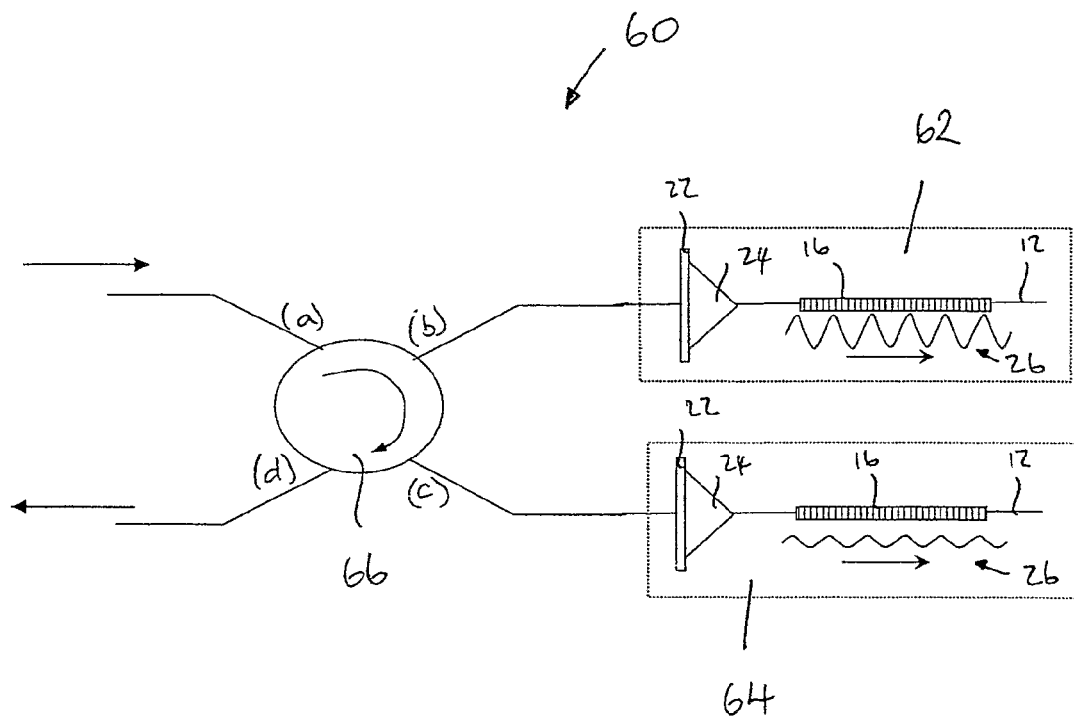
FIG. 7 is a schematic representation of a dispersion compensator, utilising two GTEs of FIG. 1, according to a fourth embodiment of the invention.
Figure 11:
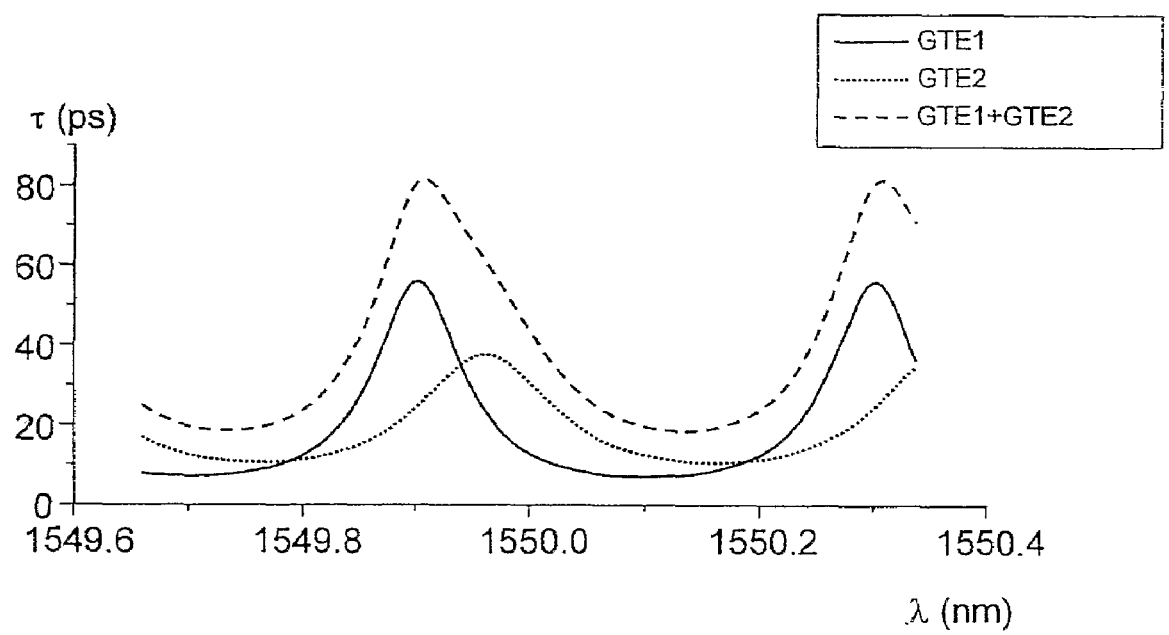
Figure 12:
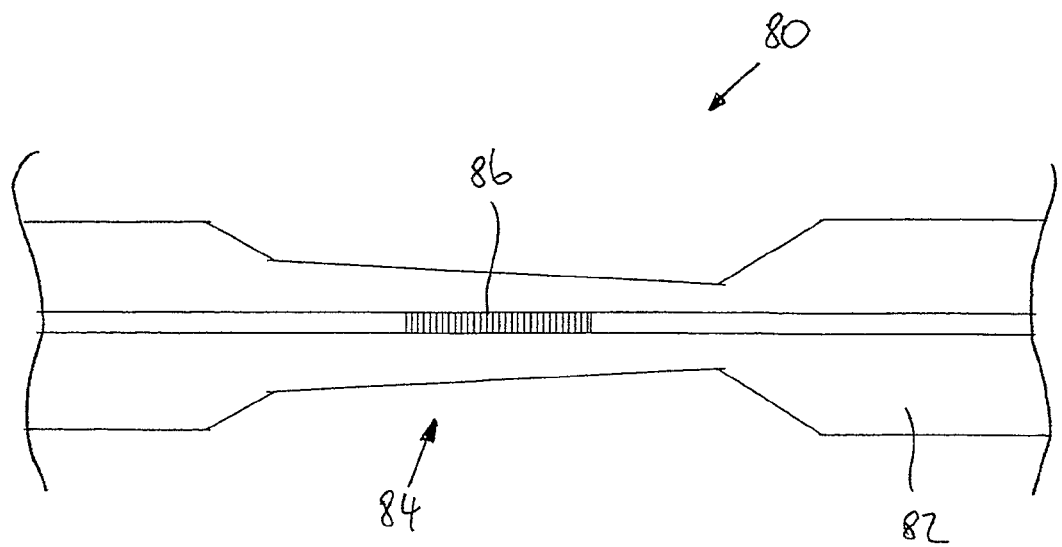
Figure 13:
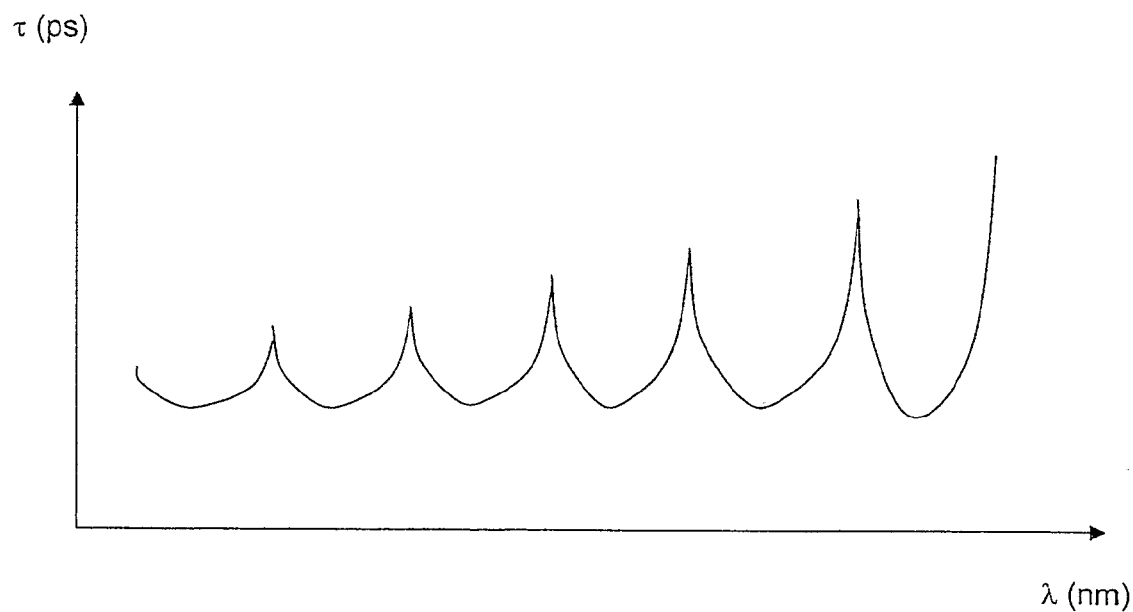
Figure 14:
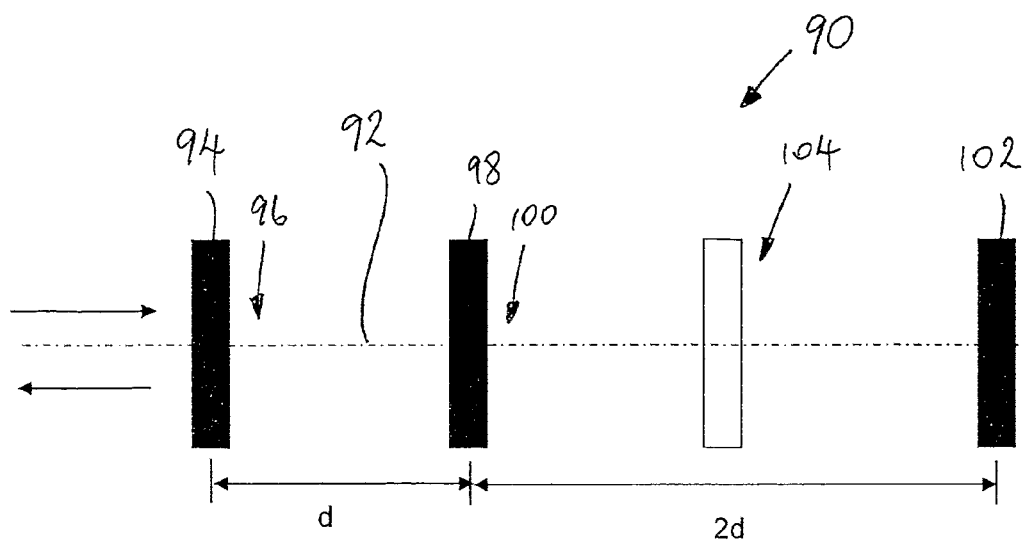
Figure 15:
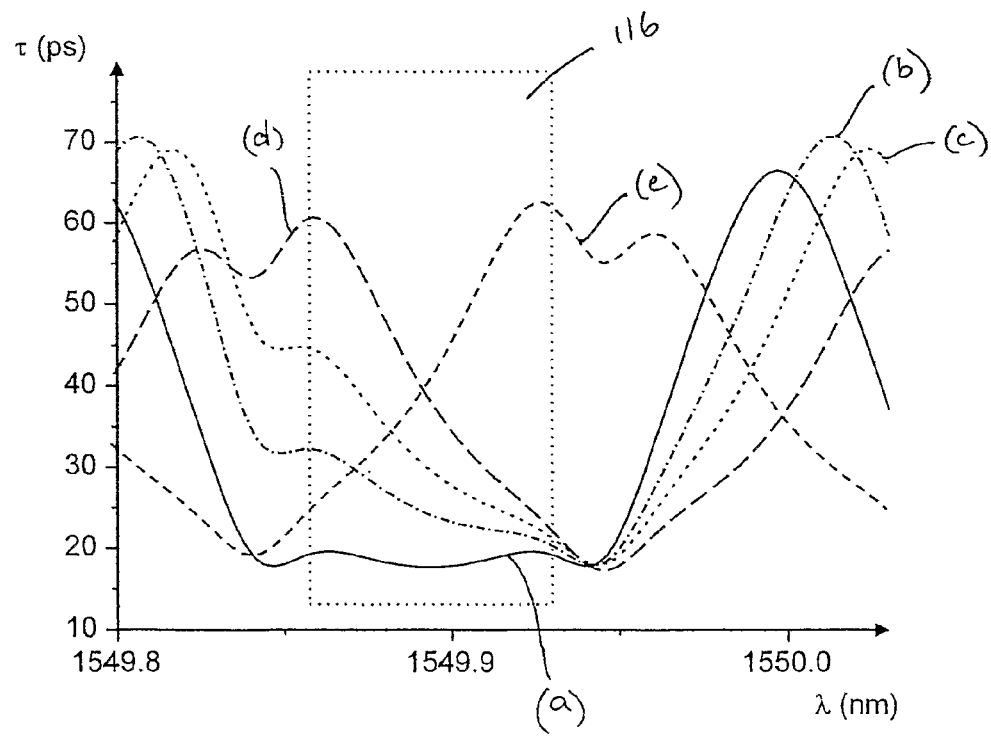
Figure 16:
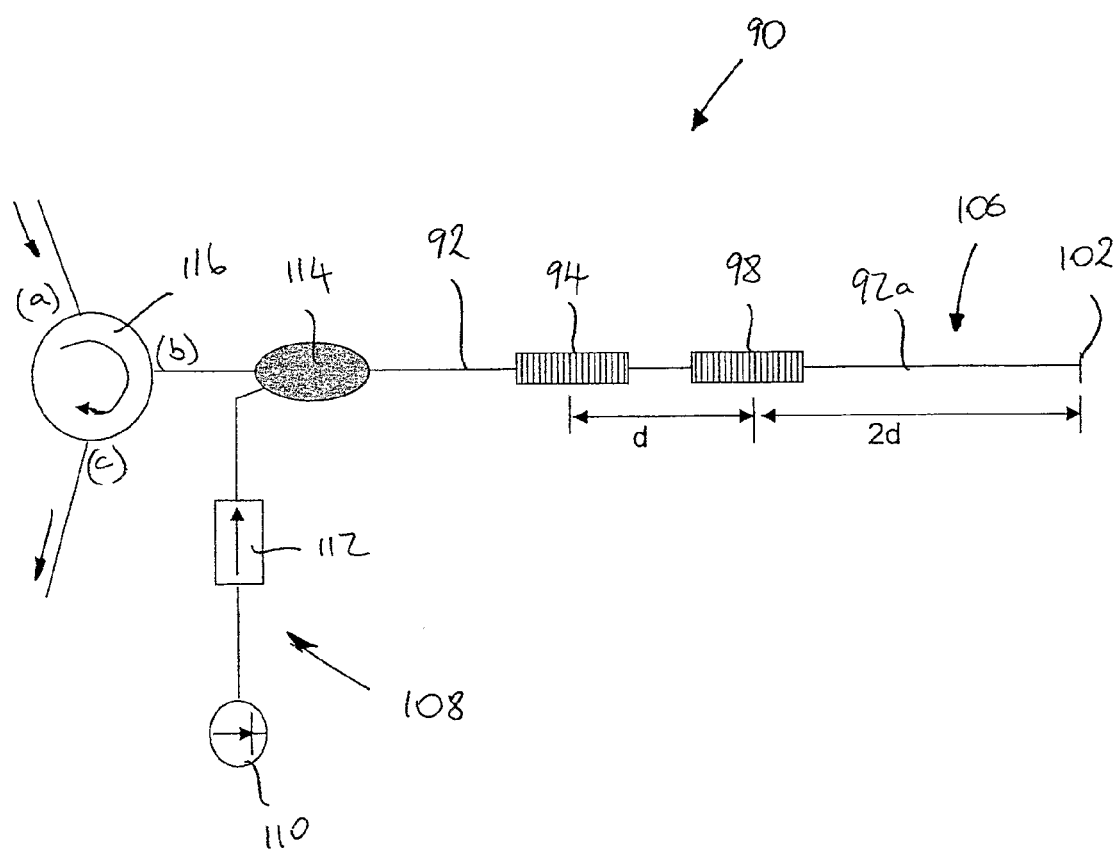
Figure 17:
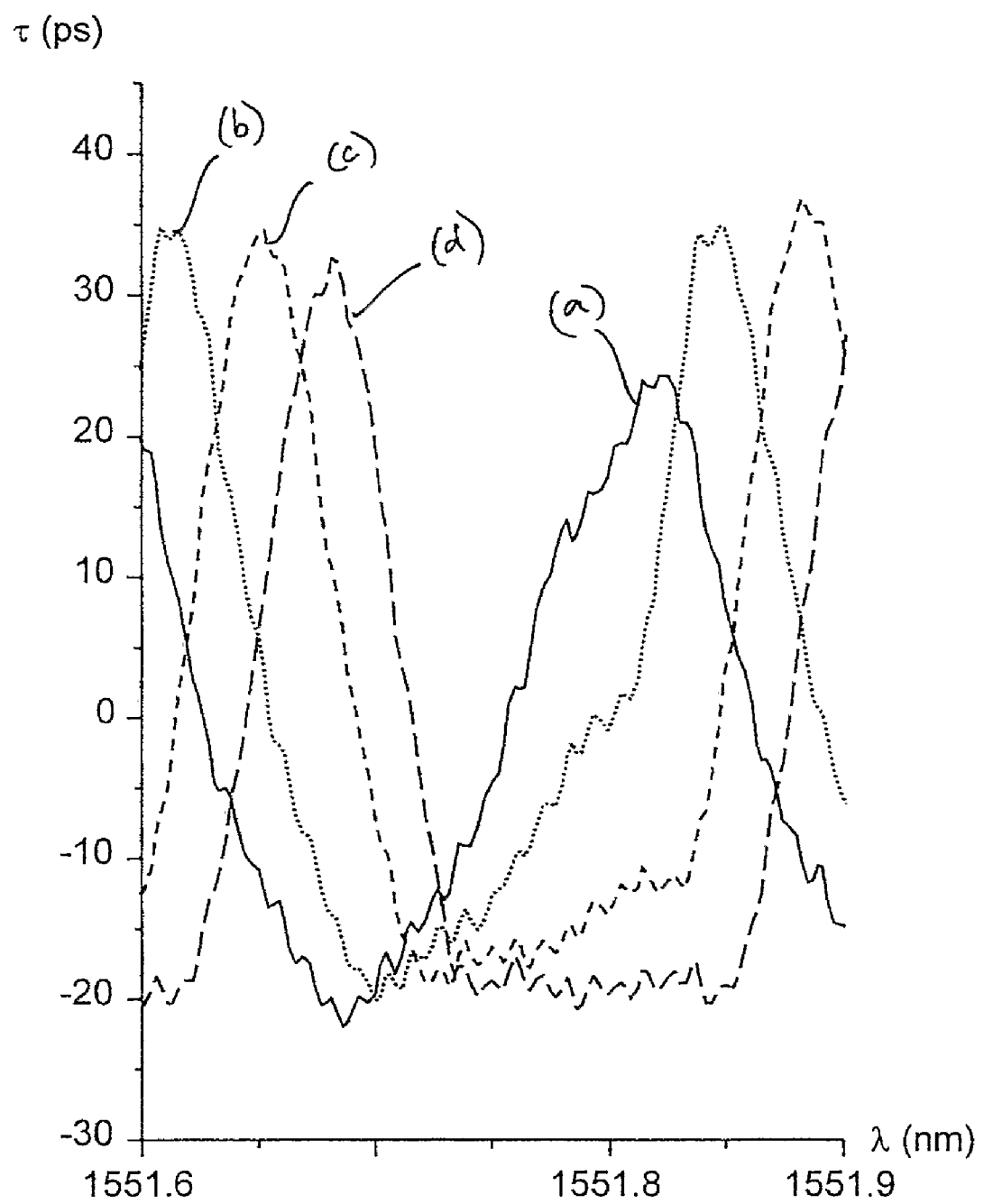
Figure 18:
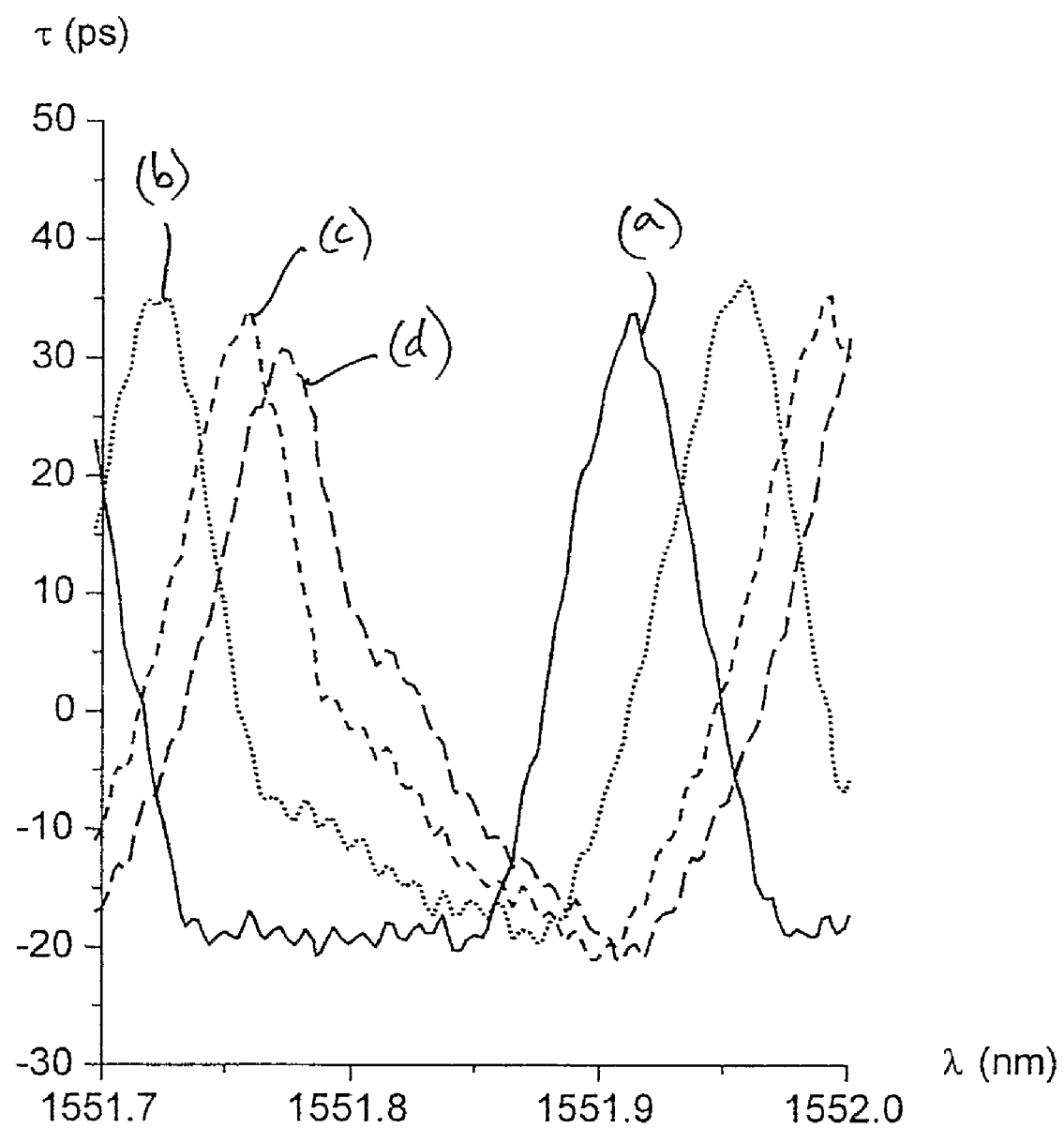
Figure 19:
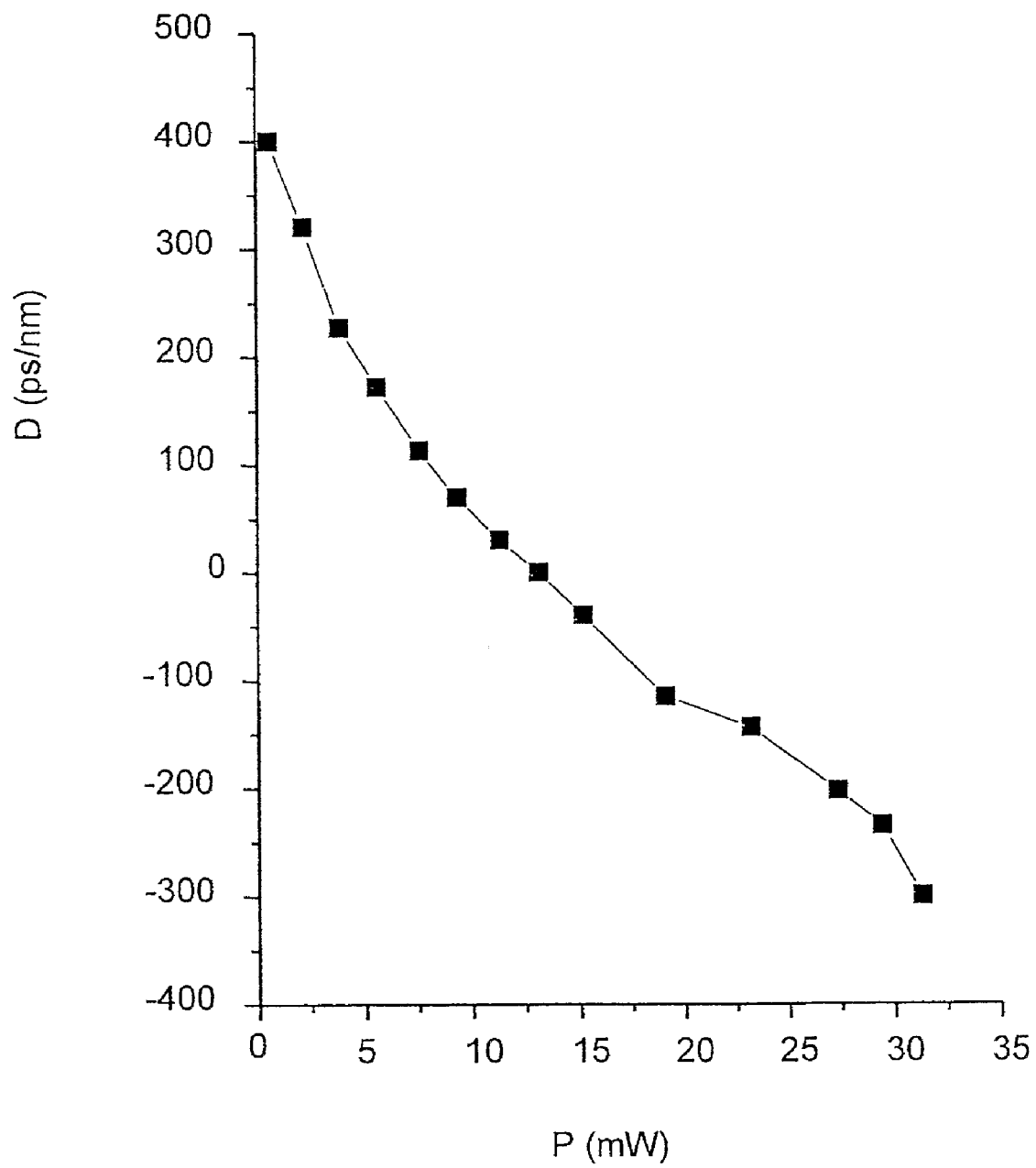

FIG. 11 shows the combined group delay ($\tau$) response as a function of wavelength ($\lambda$) of the dispersion compensator of FIG. 7, and the group delay ($\tau$) response of each of the constituent GTEs, for a low frequency (RF) modulation applied to the primary grating of each GTE causing a secondary grating of 22.5% reflectivity and 9.3% reflectivity to be generated respectively in the GTEs;

FIG. 12 is a diagrammatic representation of a primary chirped fibre Bragg grating, provided within a grating section of optical fibre having a tapered diameter, of a GTE for use in a dispersion slope compensator according to a sixth embodiment of the invention;

FIG. 13 shows the simulated group delay ($\tau$) response as a function of wavelength ($\lambda$) of a GTE having the primary chirped fibre Bragg grating of FIG. 12;

FIG. 14 is a schematic representation of a tuneable dispersion compensator according to a seventh embodiment of the invention;

FIG. 15 shows simulated group delay ($\tau$) responses as a function of wavelength ($\lambda$) for the tuneable dispersion compensator of FIG. 14, for different relative phase differences between the main and auxiliary etalon cavities;

FIG. 16 is a detailed schematic representation of the tuneable dispersion compensator of FIG. 14;

FIG. 17 shows the measured group delay ($\tau$) response as a function of wavelength ($\lambda$) of the tuneable dispersion compensator of FIG. 16, for the following optical pump powers: (a) 0 mW; (b) 3.9 mW; (c) 9.4 mW; and (d) 13.1 mW;

FIG. 18 shows the measured group delay ($\tau$) response as a function of wavelength ($\lambda$) of the tuneable dispersion compensator of FIG. 16, for the following optical pump powers: (a) 13.1 mW; (b) 19.1 mW; (c) 27.3 mW; and (d) 31.3 mW; and FIG. 19 shows the variation of the dispersion (D) of the tuneable dispersion compensator of FIG. 16 as a function of optical pump power (P).

Figure 1:
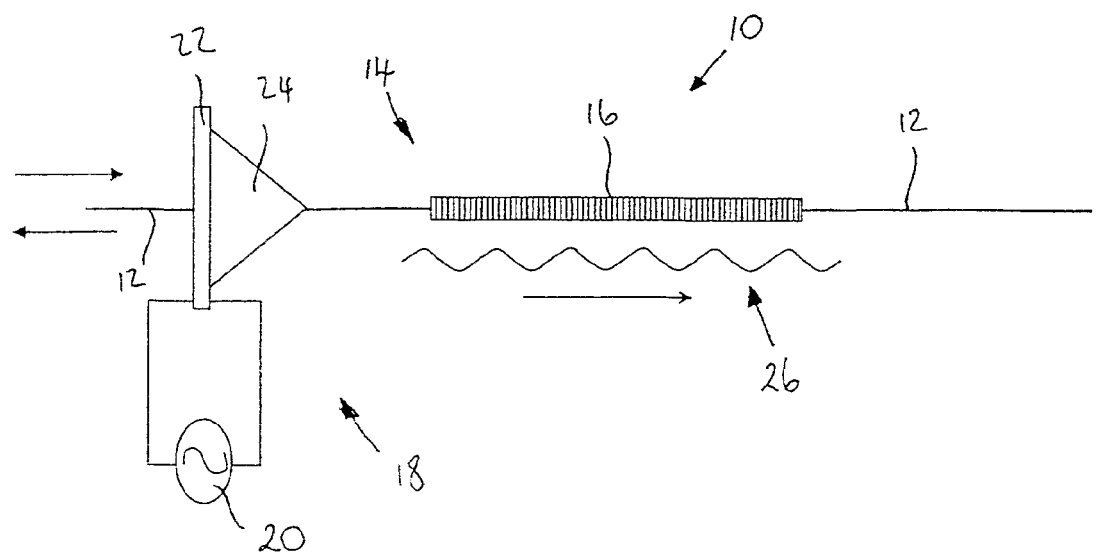
FIG. 1 is a schematic representation of a Gires-Tournois etalon (GTE) according to a first embodiment of the invention.

Referring to FIG. 1, a first embodiment of the invention provides a Gires-Tournois etalon (GTE) 10 comprising an optical waveguide 12 having a grating section 14 in which a primary chirped Bragg grating 16 is provided, and apparatus 18 for inducing a low frequency periodic refractive index modulation within the grating section 14 of the waveguide 12.

In this example, the optical waveguide 12 takes the form of a single-mode optical fibre. The primary chirped Bragg grating 16 is a strong chirped fibre Bragg grating (FBG), having a length of ~2 mm, a spectral bandwidth of 20 nm, a central resonant wavelength of 1550 nm and a reflectivity of ~99.9%.

The apparatus 18 for inducing a low frequency periodic refractive index modulation within the grating section 14 comprises an acoustic wave source in the form of an RF signal generator 20 and a piezoelectric transducer 22, and coupling means in the form of a glass horn 24 for coupling an acoustic wave (shown schematically at 26) into the optical fibre 12.

The piezoelectric transducer 22 comprises piezoelectric materials in the form of quartz, lithiumniobate and PZT, a composite of lead, zinconate and titanate. The diameter of the horn 24 is tapered, to improve the efficiency of the transmission of an acoustic wave into the optical fibre 12. The horn 24 is arranged coaxially with the optical fibre 12, with the apex of the horn 24 being coupled to the fibre 12 by means of glass solder. The piezoelectric transducer 22 is bonded to the horn 24 at its other end.

Figure 2:
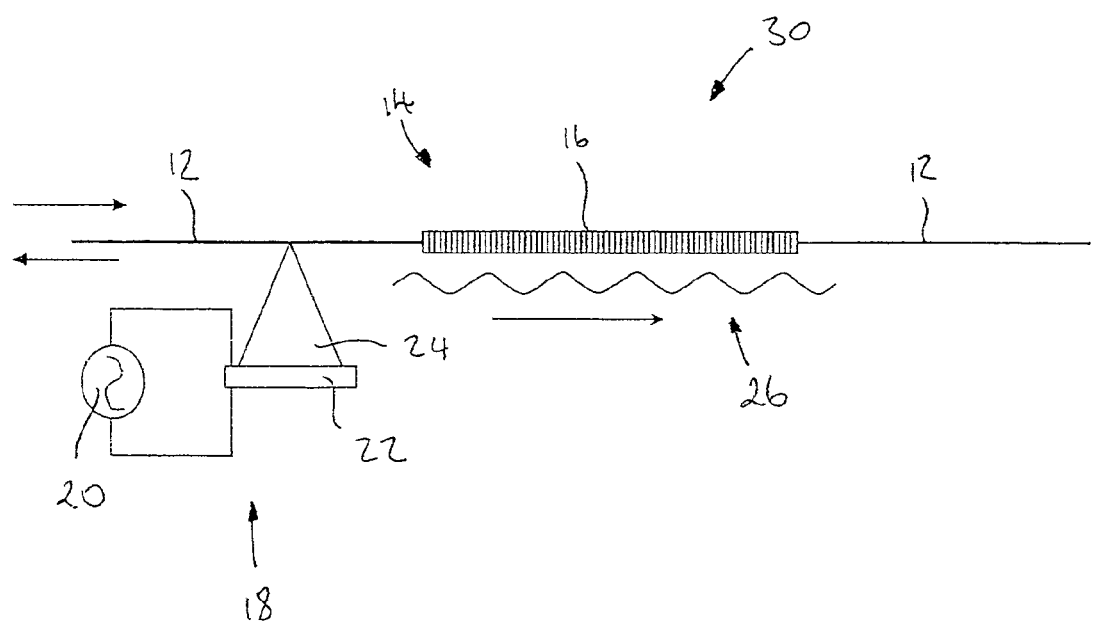
FIG. 2 is a schematic representation of a GTE according to a second embodiment of the invention.

FIG. 2 shows a GTE 30 according to a second embodiment of the invention. The GTE 30 of this embodiment is substantially the same as the GTE 10 of the first embodiment, with the following modification. The same reference numbers are retained for corresponding features.

In this embodiment, the horn 24 is coupled generally perpendicularly to optical fibre 12.

The GTEs 10, 30 of FIGS. 1 and 2 operate as follows. The RF signal generator 20 generates an RF electrical output signal, having a frequency of a few kHz to 100 MHz. The electrical output signal from the signal generator 20 drives the piezoelectric transducer 22, causing it to vibrate and thereby generate an acoustic signal. The acoustic signal is collected and focussed by the horn 24, and coupled into the optical fibre 12.

As the acoustic wave 26 propagates through the grating section 14 of the optical fibre 12, it causes a periodic compression within the optical fibre 12, which induces a periodic refractive index modulation within the grating section 14. A low-frequency refractive index modulation is thereby added to the high-frequency refractive index modulation of the chirped FBG 16.

Figure 3:
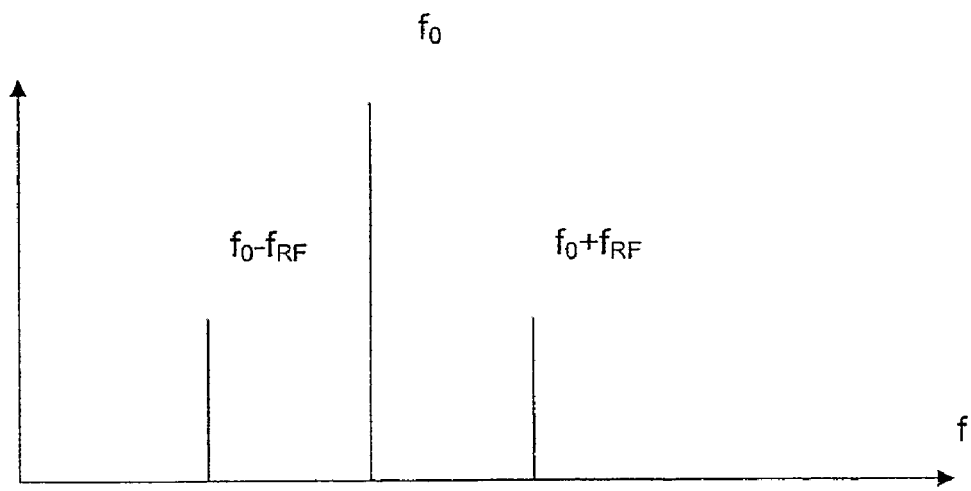
FIG. 3 illustrates the side frequency components (($f_0-f_{RF}$) and ($f_0+f_{RF}$)) generated either side of each high frequency component ($f_0$) as a result of the application of a low-frequency refractive index modulation on top of a high frequency refractive index modulation.

The addition of the low-frequency refractive index modulation to the high-frequency refractive index modulation of the chirped FBG 16 causes two side frequency components, ($f_0-f_{RF}$) and ($f_0+f_{RF}$), to be generated for each high-frequency component ($f_0$) of the chirped FBG 16, in a manner similar to radio modulation, as illustrated in FIG. 3. The side frequency components have smaller amplitudes than their originating high-frequency component.

Figure 4:
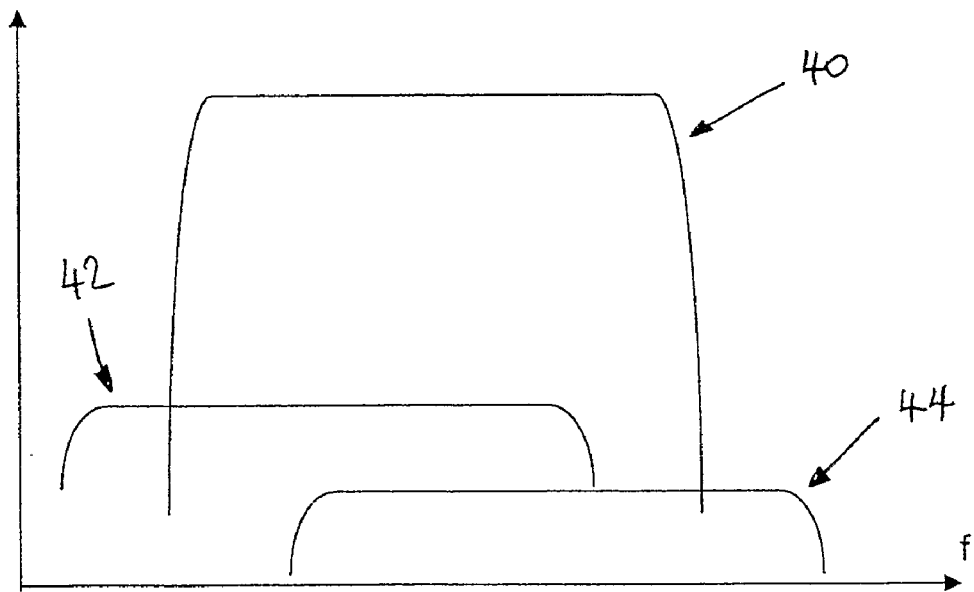
FIG. 4 illustrates the excited secondary gratings generated either side of a primary chirped Bragg grating generated by the application of a low-frequency refractive index modulation on top of the primary grating.

Since the primary chirped FBG 16 contains a band of high-frequency components, the low-frequency modulation causes two side frequency components to be generated for each high-frequency component. As illustrated in FIG. 4, the entire structure 40 of the primary chirped FBG 16 is therefore duplicated, as two excited secondary gratings 42, 44. Each excited secondary grating 42, 44 has substantially the same spectral bandwidth as the primary FBG 16, but a lower reflectivity than the primary FBG 16. The excited secondary gratings 42, 44 have different central resonant wavelengths (frequencies) than the primary FBG 16.

Each secondary grating 42, 44 and the primary FBG 16 form a GTE. Although two secondary gratings 42, 44 are excited, and two GTE cavities formed, only one cavity is used. The cavity length of each GTE is determined by the frequency of the low-frequency refractive index modulation, i.e. by the frequency of the acoustic wave 26, and the chirp rate of the chirped FBG 16. The free spectral range (FSR) of the selected GTE can therefore be adjusted by varying the frequency of the acoustic wave 26.

Figure 5:
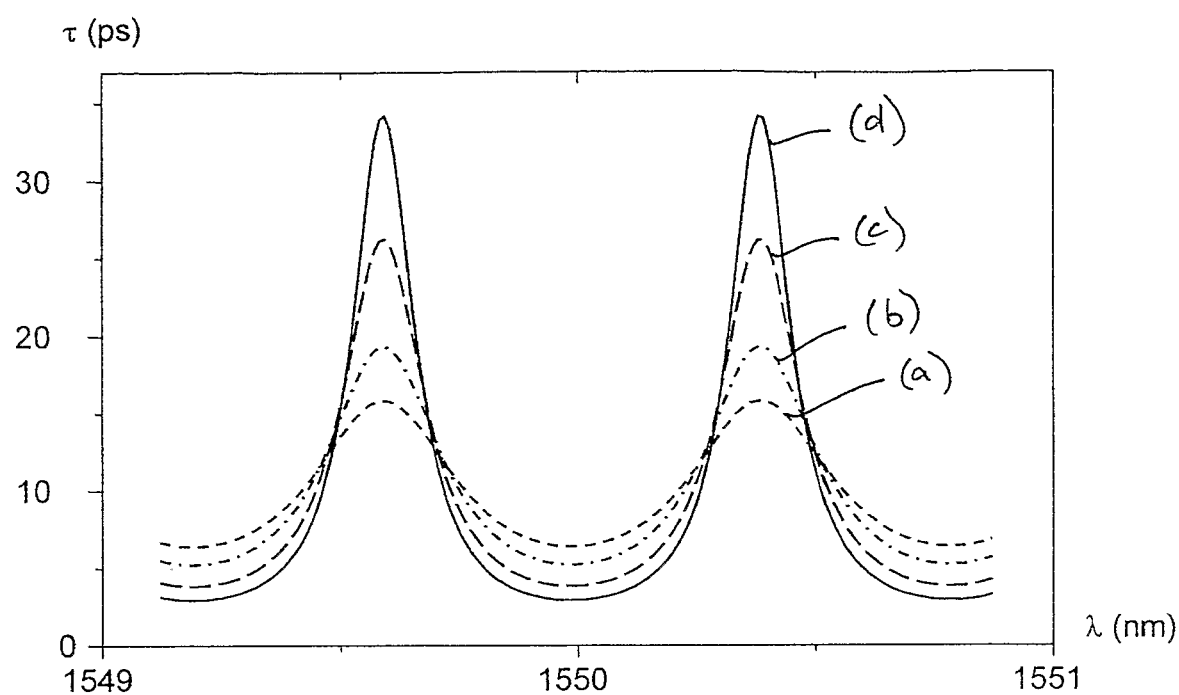
FIG. 5 shows simulated group delay ($\tau$) responses as a function of wavelength ($\lambda$) of the GTE of FIG. 1, for different reflectivities (R) of the excited secondary grating.

The reflectivity of the excited secondary gratings 42, 44 can be adjusted by changing the amplitude of the low-frequency refractive index modulation, i.e. by adjusting the amplitude of the acoustic wave 26. FIG. 5 shows simulated group delay ($\tau$) responses as a function of wavelength ($\lambda$) of the GTE 10, for the following reflectivities (R) of the excited secondary grating 42: (a) 5%; (b) 10%; (c) 20%; and (d) 30%. As shown in FIG. 5, when the reflectivity of the excited secondary grating 42 increases from 5% to 30%, the group delay amplitude of the GTE 10 increases from 9.6 ps to 31.9 ps.

Figure 6:
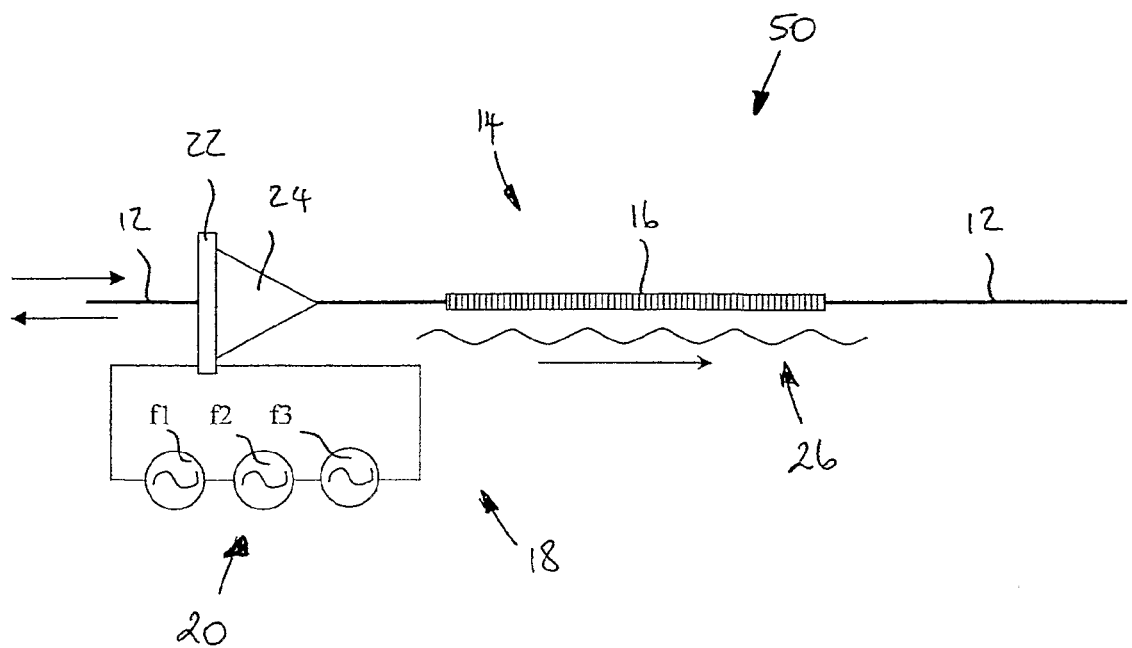
FIG. 6 is a schematic representation of a GTE according to a third embodiment of the invention.

A GTE 50 according to a third embodiment of the invention is shown in FIG. 6. The GTE 50 of this embodiment is substantially the same as the GTE 10 of the first embodiment, with the following modification. The same reference numbers are retained for corresponding features.

In this embodiment, the RF signal generator 20 is operable to simultaneously generate three RF electrical output signals each of a different frequency ($f_1$, $f_2$, and $f_3$). The frequencies $f_1$, $f_2$, $f_3$ are related to one another by the following ratios: f1:f2:f3=1:2:3. The acoustic wave 26 therefore has three frequency components ($f_1$, $f_2$, and $f_3$). As a result, three sets of excited secondary gratings are generated, and thus the GTE 50 has three etalon cavities, each of a different FSR. A multiple-cavity GTE such as this one has the advantage that it can have a larger dispersion within a specified bandwidth as compared with the single-cavity GTE 10 of the first embodiment.

A dispersion compensator 60 according to a fourth embodiment of the invention is shown in FIG. 7. The dispersion compensator 60 comprises first and second GTEs 62, 64, which may be any of the GTEs 10, 30, 50 of the previous embodiments. The same reference numbers are retained for corresponding features.

The GTEs 62, 64 are optically coupled in series by means of a four-port optical circulator 66. The first port 66a of the circulator 66 forms the input to the dispersion compensator, the second port 66b is coupled to the optical fibre 12 of the first GTE 62, the third port 66c is coupled to the optical fibre 12 of the second GTE 64, and the fourth port 66d forms the output of the dispersion compensator 60.

Because the group delay amplitude of each GTE 62, 64 can be changed by altering the amplitude of the acoustic signal 26 respectively applied to the primary FBG 16 of each GTE 62, 64, the amount of dispersion compensation that can be provided by the dispersion compensator 60 can be varied, resulting in a tuneable dispersion compensator.

In addition, because the FSR of each GTE 62, 64 can be changed by altering the frequency of the applied acoustic waves 26, the operating spectral bandwidth of the dispersion compensator 60 can also be tuned.

Figure 8:
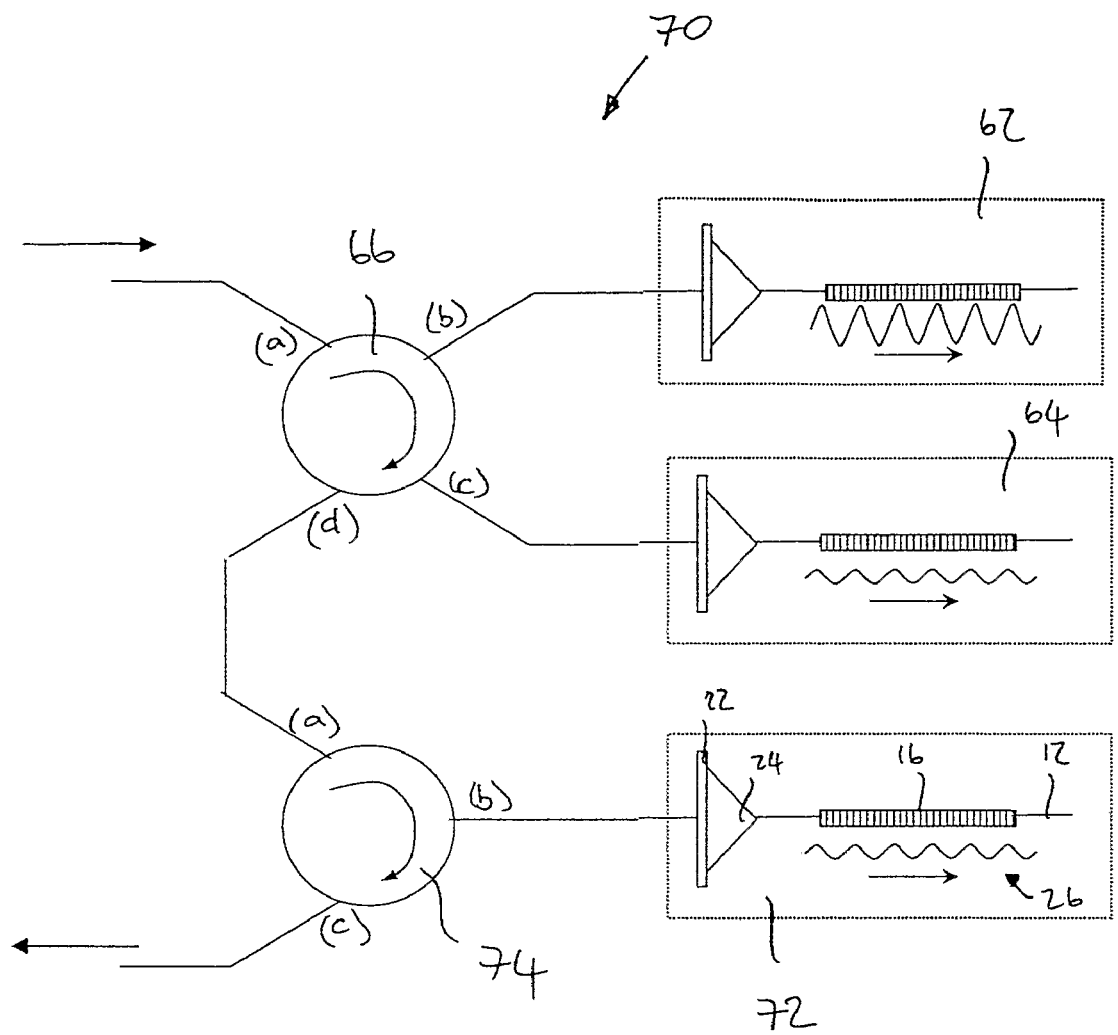
FIG. 8 is a schematic representation of a dispersion compensator, utilising three GTEs of FIG. 1, according to a fifth embodiment of the invention.

A dispersion compensator 70 according to a fifth embodiment of the invention is shown in FIG. 8. The dispersion compensator 70 of this embodiment is substantially the same as the dispersion compensator 60 of the previous embodiment, with the following modifications. The same reference numbers are retained for corresponding features.

In this embodiment, a third GTE 72 is additionally provided. The third GTE 72 may be any of the GTEs 10, 30, 50 of the first three embodiments. The third GTE 72 is optically coupled to the first and second GTEs 62, 64 by means of a three-port optical coupled 74. The first port 74a of the coupler is optically coupled to the fourth port 66d of the four-port coupler 66, the second port 74b is coupled to the optical fibre 12 of the third GTE 72, and the third port 74c forms the output of the dispersion compensator 70.

Figure 9:
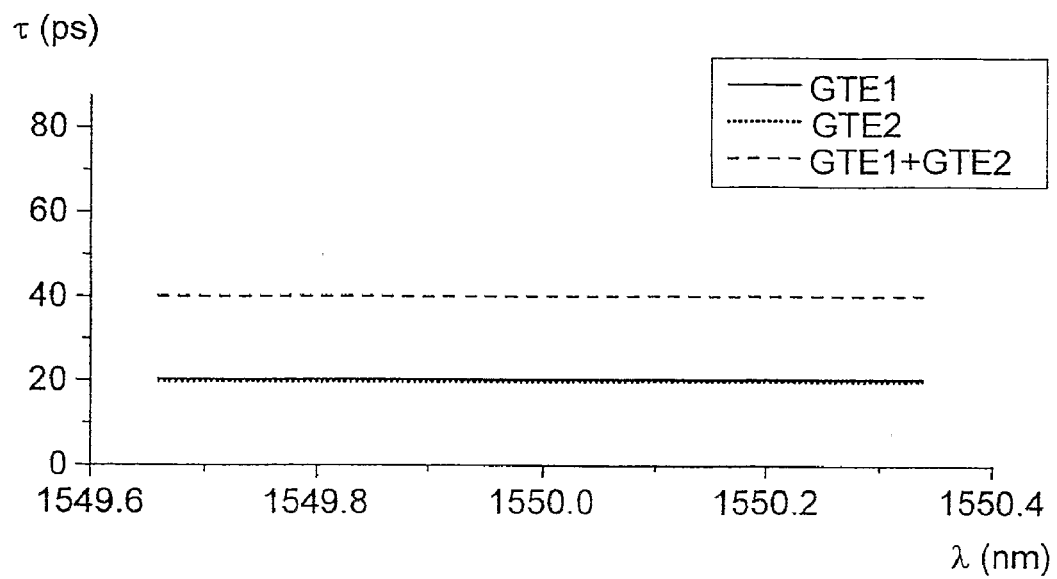
FIG. 9 shows the combined group delay ($\tau$) response as a function of wavelength ($\lambda$) of the dispersion compensator of FIG. 7, and the group delay ($\tau$) response of each of the constituent GTEs, for zero low frequency (RF) modulation applied to the primary grating of each GTE.

FIG. 9 shows the group delay ($\tau$) response of the dispersion compensator 60 of the fourth embodiment, together with the group delay ($\tau$) responses of each of the constituent GTEs 62, 64, when no low-frequency refractive index modulations, i.e. no acoustic waves, are applied to the primary FBGs 16 of the GTEs 62, 64. As can be seen, there is no variation in the group delay ($\tau$) as a function of wavelength ($\lambda$), i.e. the dispersion compensator 60 has zero dispersion.

Figure 10:
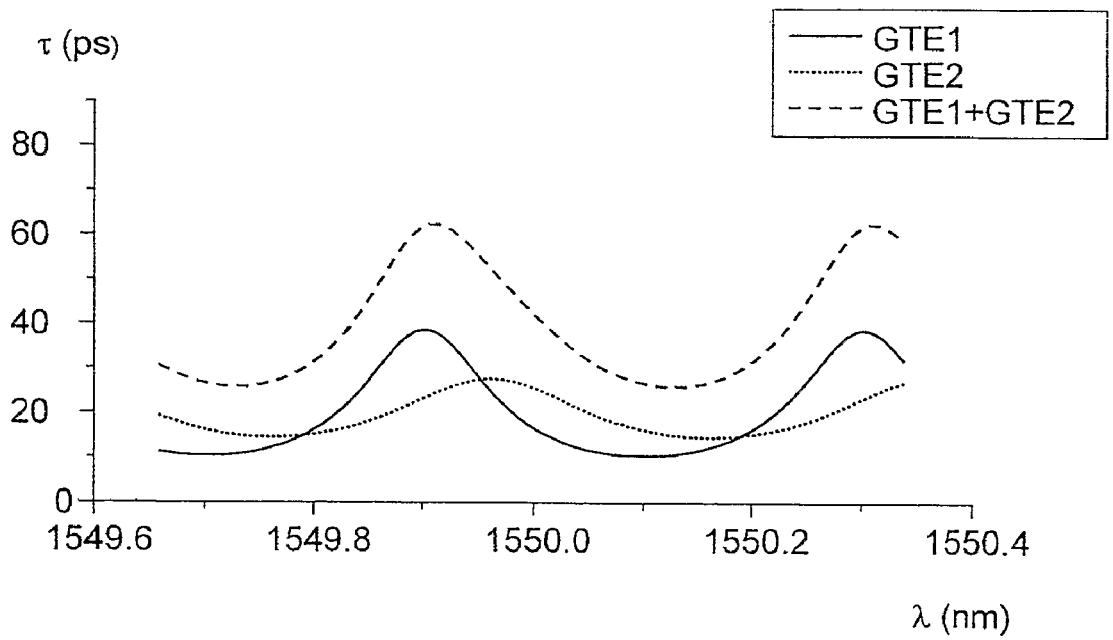
FIG. 10 shows the combined group delay ($\tau$) response as a function of wavelength ($\lambda$) of the dispersion compensator of FIG. 7, and the group delay ($\tau$) response of each of the constituent GTEs, for a low frequency (RF) modulation applied to the primary grating of each GTE causing a secondary grating of 10% reflectivity and 2.5% reflectivity to be generated respectively in the GTEs.

FIG. 10 shows the group delay ($\tau$) responses of the dispersion compensator 60 and the first and second GTEs 62, 64, when acoustic waves 26 are applied to each of the primary FBGs 16, causing excited secondary gratings to be generated. The excited secondary grating of the first GTE 62 has a reflectivity of 10% and the excited secondary grating of the second GTE 64 has a reflectivity of 2.5%. The dispersion compensator 60 has a dispersion value of −230 ps/nm.

FIG. 11 shows the group delay ($\tau$) responses of the dispersion compensator 60 and the first and second GTEs 62, 64, when excited secondary gratings are generated, the excited secondary grating of the first GTE 62 having a reflectivity of 22.5% and the excited secondary grating of the second GTE 64 having a reflectivity of 9.3%. The dispersion compensator 60 has a dispersion value of −400 ps/nm.

A dispersion slope compensator according to a sixth embodiment of the invention can be realised by replacing one or more of the primary FBGs 16 of the GTEs 10, 20, 30 of the first three embodiments, with the primary FBG 80 shown in FIG. 12.

The primary FBG 80 of this embodiment comprises an optical fibre 82, including a grating section 84 which has a tapered profile, and an FBG 86. The diameter of the optical fibre within the grating section 84 reduces along the length of the FBG 86, in the direction left to right as drawn in FIG. 12.

In operation, an acoustic wave (not shown) propagating through the grating section 84 of the fibre 82 will be compressed, causing the amplitude of the acoustic wave to increase. As a result, the group delay ($\tau$) amplitude of the GTE incorporating the primary FBG 80 increases across the spectral bandwith of the FBG 86, as illustrated in FIG. 13. That is to say, the GTE has a non-zero dispersion slope component.

A dispersion slope compensator can also be achieved using either of the dispersion compensators 60, 70 of FIGS. 7 and 8 and applying acoustic waves of slightly different frequencies to the primary chirped FBGs 16. The resulting GTEs will thus each have slightly different FSRs.

A seventh embodiment of the invention provides a tuneable dispersion compensator (TDC) 90, as shown in FIGS. 14 and 16. The TDC 90 comprises an optical waveguide in the form of an optical fibre 92, a first FBG 94, provided within a first grating section 96 of the fibre 92, a second FBG 98, provided within a second grating section 100 of the fibre 92, an optical reflector 102, which in this example takes the form of the cleaved distal end of the fibre 92, and optically tuneable phase-shifting means 104.

In this example, the optical fibre 92 comprises an Erbium-Ytterbium (Er/Yb) co-doped optical fibre. The first FBG 94 has a length of ~3.8 mm, a reflectivity of ~7%, a central resonant wavelength of 1550 nm, and a spectral bandwidth of ~9 nm. The second FBG 98 has a length of ~3.8 mm, a reflectivity of ~66%, a central resonant wavelength of 1550 nm, and a spectral bandwidth of ~9 nm. The centre-to-centre separation (d) between the first FBG 94 and the second FBG 98 is 4 mm. The first FBG 94 and the second FBG 98 together form the main etalon cavity of a coupled cavity etalon.

The cleaved end 102 of the fibre 92 forms an optical reflector having a reflectivity of ~4%. The separation between the centre of the second FBG 98 and the cleaved end 102 of the fibre 92 is 8 mm, i.e. twice the centre-to-centre separation (d) between the first and second FBGs 94, 98. The cleaved end 102 of the fibre 92 and the second FBG 98 form the auxiliary cavity of the coupled cavity etalon. By adding the optical reflector 102 the group delay response of the main cavity can be modified from quadratic to linear.

The optically tuneable phase shifting means 104 comprises an optical medium 106 having a refractive index that can be modified by optically pumping and an optical pump signal source 108 optically coupled to the optical medium. The optical medium 106 may be located either in the main cavity or in the auxiliary cavity. In this example, the optical medium 106 comprises the section 92a of the Er/Yb fibre 92 located between the second FBG 98 and the cleaved end 102 of the fibre 92.

The optical pump signal source 108 comprises a 980 nm laser diode 110. The laser diode 110 is coupled, via an optical isolator 112, to the optical fibre 92 via a wavelength division multiplexer 114.

The TDC 90 is operated in reflection, and optical signals enter and exit the TDC 90 through the first FBG 94. The TDC 90 therefore additionally comprises an optical circulator 116, the first port 116a of the circulator forming the input to the TDC 90 and the third port 116c forming the output of the TDC 90.

The optically tuneable phase-shifting means 104 is operable to introduce a relative phase-shift between the main cavity and the auxiliary cavity. This is achieved by optically pumping the Er/Yb co-doped fibre 92 with the optical output from the laser diode 110. In a doped fibre, a strong nonlinear phase shift can be introduced via a resonantly enhanced non-linearity. The optical pump signal matches the absorption transition of the dopant, and is absorbed and depletes the ground state population of the dopant. This bleaching of the absorption is associated, via Kramers-Kronig causality principle, with a change in the contribution to the core index arising from the dopant. This effect can be 109 times stronger than the intrinsic Kerr effect of silica. This is strong enough to obtain large phase shifts with low pump powers, in extremely short lengths of fibre, with response times in the nanosecond range. For some doped fibres, pump-induced thermal effects also introduce an additional phase shift. If non-radiative relaxation processes are present in the dopant, some of the absorbed pump power is turned into heat, which raises the fibre temperature and also causes a thermal phase shift.

When the Er/Yb co-doped fiber 92 is pumped, the pump induced thermal effect and resonantly enhanced nonlinearity both induce phase shifts within the main and auxiliary cavities. However, the phase shift induced within the main cavity is larger than that induced in the auxiliary cavity, due to the non-uniform distribution of optical pump power along the length of the fibre 92. The slope of the linearized group delay of the coupled cavity etalon is thereby changed. The Er/Yb co-doped fiber does not lase since insufficient optical gain is provided within the main and auxiliary cavities.

FIG. 15 shows a simulated group delay ($\tau$) responses for a coupled-cavity TDC having a first FBG reflectivity of 7%, a second FBG having a reflectivity of 70%, and a cleaved fibre end having a reflectivity of 4%. The simulation assumes a centre-to-centre separation (d) between the first and second FBGs of 4 mm. The simulation also assumes that the optically tuneable phase shifting means purely introduces a phase shift ($\Delta\Phi$) into the main cavity.

When the phase shift is set to zero, the group delay curve (a) is near flat and the average dispersion is zero in the channel region 116. When the phase shift is tuned to $0.09\pi$, $0.17\pi$, and $0.26\pi$, the TDC displays group delay curves (b), (c) and (d) respectively, and the dispersion value of the TDC is adjusted to $-170$ ps/nm, $-340$ ps/nm and $-590$ ps/nm. To achieve a TDC having a positive dispersion, a negative phase value is applied. For a phase shift of $-0.26\pi$, the TDC has a group delay curve as shown at (e) in FIG. 15, and has a dispersion of $+590$ ps/nm.

It will be appreciated that, although only one channel response is shown in FIG. 15, the TDC can provide simultaneous dispersion compensation for multiple optical channels due to its periodic response.

The difference in the phase shifts induced in the two cavities can be varied by changing the optical pump power, as shown in FIG. 17. Without optically pumping the Er/Yb co-doped fibre 92, the TDC 90 has a group delay ($\tau$) profile shown by trace (a) of FIG. 17. A slight mismatch in the cavity lengths, created during fabrication, results in the TDC 90 having an initial dispersion of $+400$ ps/nm.

Traces (b) and (c) of FIG. 17 respectively show the group delay ($\tau$) profile of the TDC 90 for optical pump powers of 3.9 mW and 9.4 mW. For these pump powers, the dispersion of the TDC 90 decreased to $+220$ ps/nm and $+70$ ps/nm, respectively. Trace (d) of FIG. 17 shows the group delay ($\tau$) profile of the TDC 90 for an optical pump power of 13.1 mW. At this pump power, the TDC 90 has zero dispersion.

Trace (a) of FIG. 18 shows the group delay ($\tau$) profile of the TDC 90 for an optical pump power of 13.1 mW. Traces (b), (c) and (d) show the group delay ($\tau$) profiles of the TDC 90 for optical pump powers of 19.1 nW, 27.3 mW and 31.3 mW respectively, giving the TDC 90 dispersions of 110 ps/nm, $-200$ ps/nm and $-300$ ps/nm.

FIG. 19 illustrates the variation of dispersion (D) as a function of optical pump power (P). It may be noted in FIGS. 17 and 18 that the central operational wavelength ($\lambda$) of the TDC 90 slightly changes with increasing pump power. This is because the FBGs 94, 98 were also heated as a result of the absorption of the optical pump signal. This effect can be minimized or avoided if one chooses an alternative doped optical fibre that has minor pump induced thermal effect, or by fabricating the gratings in standard telecomms silica fibre and using only a short section of doped fibre, spliced into the auxiliary cavity.

Various modifications may be made without departing from the scope of the invention. For example, the or each chirped Bragg grating may be of a different, length and/or central wavelength and/or reflectivity to those described. The apparatus for inducing a low frequency periodic refractive index modulation within the grating section may generate an acoustic wave having a different frequency to those described. The horn may be of a different shape and/or configuration to that shown. The horn may alternatively be made from silica or metal. A different number of acoustic waves, of different frequencies to those described, may be simultaneously applied to a primary FBG.

The grating section of the fibre may need to be etched to smaller diameter to achieve higher acoustic efficiency.

The apparatus for inducing a low frequency periodic refractive index modulation within the grating section may alternatively comprise mechanical means operable to induce microbends within the grating section of the waveguide.

The dispersion compensators may comprise a different number of GTEs to those described, and the GTEs may be optically coupled to one another using alternative coupling means, such as optical fibre couplers.

In the tuneable dispersion compensator, a different type of rare earth doped optical waveguide, including planar optical waveguides, may be used in place of the Er/Yb co-doped optical fibre described. The chirped Bragg gratings may have a different length and/or reflectivity and/or bandwidth to those described, and the bandwidth may be up to approximately 20 nm. The cleaved end of the optical fibre may be replaced by a third chirped Bragg grating. The optical medium of the optically tuneable phase shifting means may be any linear or nonlinear medium as long as its refractive index can be effectively modified. For example, fibres doped with other rare-earth absorbers, or other absorbers, are also suitable for this application. The optical pump source may be a different type of laser to that described, and may be of a different wavelength, which will at least in part be determined by the optical medium being used.

The described embodiments provide various advantages, as follows.

The GTEs are all-in-fibre devices and are thus fully compatible with optical fibre transmission systems and display low optical losses. The GTEs are fully tuneable in terms of their group delay amplitude and free spectrum range. The GTEs are easier to fabricate than previously known GTEs, since only one grating must be fabricated. In addition, two fibre Bragg gratings must be fabricated in order to form a GTE structure. The described GTEs solve at least some of the problems associated with previously developed all fibre grating GTEs, since both the cavity length and reflectivity of the excited secondary grating can be altered during use. As a result, both the available dispersion tuning range and useful bandwidth are extended.

The tuneable TDC provides the advantages of fast response times, due to the fast response of the pumped optical medium. The use of optical pumping to control the relative phase difference between the main and auxiliary cavities, and thus the dispersion value of the TDC, allows the TDC to be remotely controllable, since the pump laser may be located at a distance from the coupled cavity etalon. In addition, large phase shifts may be achieved with low optical pump powers, using extremely short lengths of doped optical fibre, with response times in the nanosecond range.

The invention claimed is:

1. A Gires-Tournois etalon comprising:
an optical waveguide including a grating section in which a primary chirped Bragg grating, of a first reflectivity, a first central wavelength, and a first spectral bandwidth, is provided; and
apparatus for inducing a low frequency periodic refractive index modulation within the grating section, wherein the addition of the low frequency periodic refractive index modulation to the primary chirped Bragg grating causes a secondary chirped Bragg grating, of a second reflectivity, a second central wavelength, and a second spectral bandwidth, to be excited, the first and second spectral bandwidths being substantially the same, the second reflectivity being lower that the first reflectivity, and being determined by the amplitude of the low frequency periodic refractive index modulation, and the second central wavelength being shifted from the first central wavelength by an amount determined by the frequency of the low frequency periodic refractive index modulation.

2. An etalon as claimed in claim 1, wherein the first chirped Bragg grating is a strong chirped Bragg grating, having a first reflectivity of eighty percent or higher.

3. An etalon as claimed in claim 1, wherein the apparatus for inducing a low frequency periodic refractive index modulation is operable to simultaneously induce a plurality of low frequency periodic refractive index modulations of different frequency within the grating section, to thereby cause a plurality of secondary chirped Bragg gratings, each of a different central wavelength, to be excited.

4. An etalon as claimed in claim 1, wherein the or each excited chirped Bragg grating is a weak chirped Bragg grating, having a reflectivity of fifty percent or lower.

5. An etalon as claimed in claim 4, wherein the or each excited chirped Bragg grating has a reflectivity of less than one percent.

6. Apparatus as claimed in claim 1, wherein the apparatus for inducing a low frequency periodic refractive index modulation is operable to vary the frequency of the or each low frequency periodic refractive index modulation, to thereby enable the wavelength shift between the primary chirped Bragg grating and the or each excited chirped Bragg grating to be changed.

7. Apparatus as claimed in claim 1, wherein the apparatus for inducing a low frequency periodic refractive index modulation is operable to vary the amplitude of the or each low frequency periodic refractive index modulation, to thereby enable the reflectivity of the or each excited chirped Bragg grating to be changed.

8. Apparatus as claimed in claim 1, wherein the apparatus for inducing a low frequency periodic refractive index modulation comprises an acoustic wave source and coupling means for coupling an acoustic wave into the optical waveguide.

9. Apparatus as claimed in claim 8, wherein the acoustic wave source is operable to generate one or more acoustic waves having a frequency within the radio frequency signal frequency range.

10. Apparatus as claimed in claims 8 or 9, wherein the acoustic wave source comprises a signal generator operable to generate a radio frequency electrical output signal, a signal transducer for receiving the electrical output signal and converting it into an acoustic wave, and an acoustic horn coupled to the signal transducer.

11. Apparatus as claimed in any of claims 1 to 7, wherein the apparatus for inducing a low frequency periodic refractive index modulation is a mechanical apparatus operable to induce microbends within the grating section of the waveguide.

12. Apparatus as claimed in claim 1, wherein the optical waveguide is an optical fibre.

13. Apparatus as claimed in claim 1, wherein the optical waveguide comprises a planar optical waveguide.

14. Apparatus as claimed claim 1, wherein the thickness of the grating section of the optical waveguide is reduced by etching the waveguide.

15. A dispersion compensator comprising: a plurality of Gires-Tournois etalons as claimed in claim 1, the output of a first Gires-Tournois etalon being optically coupled to the input of a subsequent Gires-Tournois etalon, wherein an optical pulse propagating through the dispersion compensator interacts with each Gires-Tournois etalon in series, the distance each wavelength component of the pulse travels before exiting each Gires-Tournois etalon varying with wavelength, such that a wavelength dependent delay is applied to each wavelength component, thereby applying dispersion to the pulse.

16. A dispersion compensator as claimed in claim 15, wherein the frequency of the low frequency refractive index modulation of each Gires-Tournois etalon is the same, thereby enabling compensation of first order dispersion to be performed.

17. A dispersion compensator as claimed in claim 15, wherein the frequency of the low frequency refractive index modulation of each Gires-Tournois etalon is different, giving each Gires-Tournois etalon a different free spectral range, thereby enabling compensation of second order dispersion to be performed.

18. A dispersion compensator as claimed in claim 17, wherein the free spectral range of each Gires-Tournois etalon is larger than the free spectral range of the subsequent Gires-Tournois etalon, the dispersion slope compensator thereby having a negative dispersion slope.

19. A dispersion compensator as claimed in claim 17, wherein the free spectral range of each Gires-Tournois etalon is smaller than the free spectral range of the subsequent Gires-Tournois etalon, the dispersion slope compensator thereby having a positive dispersion slope.

20. A dispersion compensator as claimed in 15, wherein the grating section of the waveguide of one or more Gires-Tournois etalons tapers in thickness along its length, giving the or each Gires-Tournois etalon a group delay profile having an amplitude which varies with wavelength, thereby enabling compensation of second order dispersion to be performed.

21. A tuneable dispersion compensator comprising:
an optical waveguide having a first grating section in which a first optical waveguide grating is provided and a second grating section in which a second optical waveguide grating is provided, the first and second optical waveguide gratings together forming the main etalon cavity of a coupled cavity etalon, at least part of the spectral profile of each grating including the same wavelength range;
an optical reflector, the second optical waveguide grating and the optical reflector together forming the auxiliary etalon cavity of the coupled cavity etalon; and
optically tuneable phase-shifting means provided within one of the main etalon cavity and the auxiliary etalon cavity, and being operable to introduce a phase-shift into the cavity, such that the slope of the linearized group delay of the coupled cavity etalon may be changed by adjusting the relative phases of the coupled cavities.

22. A tuneable dispersion compensator as claimed in claim 21, wherein the first and second optical waveguide gratings are chirped Bragg gratings.

23. A tuneable dispersion compensator as claimed in claims 21 or 22, wherein the first optical waveguide grating forms the input to the coupled cavity etalon and has a low reflectivity, and the second optical waveguide grating has a higher reflectivity than the first grating.

24. A tuneable dispersion compensator as claimed in claim 23, wherein the first optical waveguide grating has a reflectivity of fifteen percent or less and the second optical waveguide grating has a reflectivity of between fifty percent and eighty-five percent.

25. A tuneable dispersion compensator as claimed in claim 21, wherein the optical reflector comprises a cleaved end of the optical waveguide or a third optical waveguide grating.

26. A tuneable dispersion compensator as claimed in claim 21, wherein the main etalon cavity has a first cavity length and the auxiliary etalon cavity has a second cavity length which is generally double the first cavity length.

27. A tuneable dispersion compensator as claimed in claim 21, wherein the optically tuneable phase-shifting means comprises an optical medium having a refractive index that can be modified by optically pumping and an optical pump signal source optically coupled to the optical medium.

28. A tuneable dispersion compensator as claimed in claim 27, wherein the optical medium comprises a section of a doped optical waveguide.

29. A tuneable dispersion compensator as claimed in claim 28, wherein the optical medium comprises a section of a rare-earth element doped optical waveguide, such as an Erbium doped optical waveguide or an Erbium-Ytterbium co-doped optical waveguide.

30. A tuneable dispersion compensator as claimed in claim 28, wherein the optical pump signal source is operable to vary the optical power of the optical pump signal, thereby enabling the magnitude of the phase-shift introduced into the cavity to be altered.

* * * * *

UNITED STATES PATENT AND TRADEMARK OFFICE
CERTIFICATE OF CORRECTION

PATENT NO. : 7,580,184 B2
APPLICATION NO. : 11/813424
DATED : August 25, 2009
INVENTOR(S) : Xuewen Shu et al.

Page 1 of 1

It is certified that error appears in the above-identified patent and that said Letters Patent is hereby corrected as shown below:

On the title page, item [56]: on page 2, under "Other Publications", in column 2, line 13, delete "Techinical" and insert -- Technical --, therefor.

On the title page, item [56]: on page 2, under "Other Publications", in column 2, line 20, delete "Technlogy," and insert -- Technology, --, therefor.

In column 8, line 50, delete "bandwith" and insert -- bandwidth --, therefor.

In column 9, line 5, delete "-9 nm." and insert -- ~9 nm. --, therefor.

In column 10, line 40, delete "19.1 nW," and insert -- 19.1 mW, --, therefor.

Signed and Sealed this

Seventeenth Day of November, 2009

David J. Kappos
*Director of the United States Patent and Trademark Office*